US005268015A

United States Patent [19]

Furtak et al.

[11] Patent Number: 5,268,015

[45] Date of Patent: Dec. 7, 1993

[54] PROCESS FOR THE RECEPTION OF MINERAL FIBERS

[75] Inventors: Hans Furtak, Speyer Am Rhein, Fed. Rep. of Germany; Wilfrid Naber, Rantigny; Raymond Lejeune, Rouen, both of France

[73] Assignee: Isover Saint-Gobain, Courbevoie, France

[21] Appl. No.: 989,934

[22] Filed: Dec. 10, 1992

Related U.S. Application Data

[60] Continuation of Ser. No. 765,185, Sep. 25, 1991, abandoned, which is a division of Ser. No. 545,606, Jun. 29, 1990, Pat. No. 5,065,478.

[30] Foreign Application Priority Data

Jun. 29, 1989 [EP] European Pat. Off. ............ 401864.7

[51] Int. Cl.[5] ............ C03B 37/04

[52] U.S. Cl. ............ 65/4.4; 65/6; 156/62.4; 264/8; 264/12

[58] Field of Search ............ 65/4.4, 6, 9, 14; 156/62.4, 62.6, 62.8; 264/8, 12

[56] References Cited

U.S. PATENT DOCUMENTS

| | | | |
|---|---|---|---|
| 2,442,880 | 6/1948 | Schwartz | 19/296 |
| 2,714,081 | 7/1955 | Burgon | 19/302 X |
| 2,897,874 | 4/1959 | Stalego et al. | 65/9 X |
| 2,913,365 | 11/1959 | Osborne et al. | 19/302 X |
| 2,993,239 | 7/1961 | Heritage | 264/518 X |
| 3,493,452 | 2/1970 | Cole | 19/296 X |
| 3,509,604 | 5/1970 | Furbeck | 19/302 X |
| 3,546,898 | 12/1970 | Langlois et al. | 65/9 X |
| 3,787,194 | 1/1974 | Rayle et al. | 19/302 X |
| 3,810,817 | 5/1974 | Arledter | 162/301 |
| 3,961,397 | 6/1976 | Neuenschwander | 19/303 X |
| 4,154,649 | 5/1979 | Stotz et al. | 162/347 X |
| 4,201,247 | 5/1980 | Shannon | 65/4.4 X |
| 4,353,686 | 10/1982 | Hosler et al. | 425/83.1 |
| 4,495,119 | 1/1985 | Chung | 264/518 X |
| 4,632,685 | 12/1986 | Debouzie et al. | 65/4.4 X |
| 4,709,340 | 11/1987 | Ahlstrand | 19/296 |
| 4,716,628 | 1/1988 | Bacchio | 19/296 X |

FOREIGN PATENT DOCUMENTS

| | | | |
|---|---|---|---|
| 2088396 | 1/1972 | France . | |
| 2176935 | 11/1973 | France . | |
| 775722 | 5/1957 | United Kingdom | 65/4.4 |

OTHER PUBLICATIONS

Textilverbundstoffe, Dipl. -Ing. Dr. Radko Krcma, 170–173.

*Primary Examiner*—Robert L. Lindsay

*Attorney, Agent, or Firm*—Oblon, Spivak, McClelland, Maier & Neustadt

[57] ABSTRACT

The invention relates to the reception of fibers under fibering machines to obtain a mat of mineral wool. It proposes assigning to each fibering machine its own collecting zone, the surfaces of the collecting zones increasing in the direction of the increase of base weight. The invention also proposes a device characterized by the presence of two reception drums for three fibering machines.

4 Claims, 3 Drawing Sheets

PROCESS FOR THE RECEPTION OF MINERAL FIBERS

This application is a continuation of application Ser. No. 07/765,185, filed on Sep. 25, 1991, now abandoned which is a divisional of Ser. No. 07/545,606, filed Jun. 29, 1990 now U.S. Pat. No. 5,065,478.

BACKGROUND OF THE INVENTION

1. Field of the Invention

The invention relates to techniques for the reception of insulating mineral fibers, particularly glass fibers, to separate under the fibering machines, fibers and ambient gases, particularly induced gases or gases having been used for drawing these fibers, to produce a mat of mineral wool.

2. Discussion of the Background

An important stage in the production of products with a mineral fiber base such as glass fibers is that of their collection under the fibering machines. This operation has as its object the separation of fibers and the large amounts of gas generated by the fibering by the burners and especially by air induction. This separation is performed in a well-known way by suction through a reception device which is permeable to gases and impermeable to fibers.

An ordinary type of reception device known as belt reception is described, for example, in patent U.S. application No. 3,220,812, where it is proposed to receive the fibers coming from a series of fibering machines on a single conveyor of the gas-permeable endless belt type, under which a box is placed under partial vacuum or, multiple boxes under independent partial vacuum. In this reception type, the fibering machines can be brought together to the limits of their respective space requirements, which makes possible relatively short lines; this point being significant if it is known that some production lines can reach the number of 9 fibering machines or more, each fibering machine being of a diameter on the order of 600 mm, for example. Moreover, the only limit lower than the base weight (or surface weight) of the felt produced is that dictated by the mechanical strength problems, which therefore allows the production of the lightest products able to be obtained.

However, obtaining heavy products poses many problems, hereafter in this description, heavy products are products whose base weight is, for example, greater than 2.5 kg/m$^2$ involving glass wool products whose micronaire value is 3 to 5 g, with the exception of dense products obtained by molding and pressing which do not enter directly into the scope of this invention. This problem is easily explained by the fact that the heavier the mat is that is attempted to be produced, the larger the amount of fibers which are deposited on the same surface of the endless belt, and therefore the greater the resistance to the passage of the gases. To compensate this lower permeability, a greater partial vacuum should be exerted, which has the effect of a crushing of the felt by the pressure of the gases, crushing especially notable in the lower part of the felt, which corresponds to the fibers collected in the first place. The mechanical performances of the product especially at the level of recoveries of thickness after compression thereby are poorer. The degradation of the quality of the resulting product is very appreciable as soon as the partial vacuum has to be brought beyond 8000 to 9000 Pa, while in some installations, a partial vacuum of more than 10,000 Pa already is necessary for mats whose base weight is 2500 g/m$^2$.

To eliminate this drawback, the gases, certainly, can be sucked in only partially to limit the partial vacuum to a value not damaging the felt, but there then occurs a backflow phenomenon of the fibers in the direction of the fibering machines. Apart from the fact that it impairs a good drawing, this backflow of gases causes an increase of the temperature in the fibering hood and therefore a danger of pregelling of the binder, i.e., a polymerization of the binder while the fibers are still in the unit state, which removes from it almost all activity. Moreover, this backflow can cause the forming of rovings, i.e., dense units of agglomerated fibers, which impair the homogeneity of the product, its appearance, and lower its heat resistance.

It also can be attempted to reduce the rate of passage of the gases through the felts by separating the fibering machines from one another. However, the actual gain is very low because the increase of the dimensions of the hood causes an increase of the air induction and therefore the amount of air to be sucked in.

In patent application EP-A-102 385, it has been proposed to separate the reception into two parts each receiving the fibers produced by one fibering machine out of two. The reception then comprises two conveyors oriented toward one another, to assemble the two formed half-felts. This reception type offers the advantage of providing products with a beautiful outside appearance due to the presence on the two faces of sized over skins which improve the mechanical strength of the product. However, the space requirement of the reception is larger than in a traditional reception and, for high base weights, a beginning of polymerization of the binder can occur before the joining of the half-felts which triggers a delamination of the product.

Further, this notion of a subdivision of receptions was developed in U.S. application No. 4,120,676, which proposes to join a reception unit to each fibering machine, the production line thus being designed as a juxtaposition of basic modules each producing a relatively thin felt, the various thin felts being stacked later to form no more than one felt of great thickness.

This modular design makes it possible to keep the fibering conditions constant whatever the product produced may be. However, it assumes that the lightest products are obtained with a line used very widely below its theoretical capability, which is hardly advantageous from an economical viewpoint.

Another example of modularization of the production lines of mineral wool is given by the so-called receptions- with drums joined to a lapper. In this case exemplified by U.S. application No. 2,785,728, the reception is performed on elements in rotation of the drum type. A blank of a low base weight is prepared by a reception device facing one or two fibering machines, consisting of a pair of drums turning in opposite rotation whose perforated surface makes possible the suction of gases by suitable devices placed in the drums. The blank is formed between the drums and falls on a vertical plane before being taken up by the lapper, i.e., an oscillating device which deposits it in interlaced layers on a conveyor where the felt of the desired high base weight is obtained.

These modular designs of receptions make it possible in theory to aim at a much wider range of products if a systematic beginning is made by the production of a felt of low base weight.

However, this assumes a larger initial investment with, moreover, the multiplication of auxiliary equipment (suction and washing devices, in particular). Further the means of partitioning the receptions leads to a large spacing of the fibering machines, and exceptionally long production lines are reached as soon as the number of fibering machines is multiplied.

Moreover, the risks of delamination and irregularity of the product prohibit the production of felts of lower base weights. Thus, a lapper calls for a blank of at least 100 g/m$^2$ below which its mechanical strength would be insufficient particularly to support the movements of the pendulum, and a sufficient number of superposed layers—to have an optimization of the distribution with the same number of layers at any point of the felt.

Further, to operate systematically with the same flow of fiberized mass certainly comes down to being placed under conditions favoring the reproducibility of the parameters of the fiberizing and, by the same reproducibility, their optimization, but it is especially to manage without the extraordinary capability of the fibering machines to operate according to the flows of fiberized material going, for example, from 1 to 10.

Finally, with equal fiber qualities, a product is marketed at a lower price when its base weight decreases. Therefore it does not seem very wise to be placed precisely in the position where the line produces the lowest tonnages.

SUMMARY OF THE INVENTION

Accordingly, an object of this invention is to provide a novel design of the felt production unit receptions of mineral wool, particularly of glass wool, tending to broaden the range of products able to be produced by the same production line; this broadening of the range extending both to the low and the high base weights so as to increase the versatility of the production line, while preserving or even improving the quality of the products obtained. The range of products produced goes, for example, from 300 to 4000 g/m$^2$ or more by optionally associating a lapper.

The invention proposes a process of reception for the separation of fibers and gases produced by multiple fibering machines to obtain a mat of mineral wool, process according to which the fibers are collected by suction of the gases, each fibering machine having its own collecting zone Zi, the fibers collected in various collecting zones Zi being evacuated from the collecting zone by one or more zones Zi, this process of reception being characterized by the fact that the surfaces of collecting zones Zi are increasing in the direction of the increase of the base weights on the conveyor belts.

In other words, the closer a fibering machine to the place of final forming, the larger collecting zone Zi that is assigned to it, which makes it possible to compensate the largest resistance to the passage of the gases due to the removal on the same conveyor belts of fibers coming from more distant fibering machines.

Advantageously, it is operated at a constant backflow rate.

By backflow rate is meant the percentage of gas not sucked in at the level of the reception. Preferably, this rate is zero, even for the fibering machines downstream from the line. The collecting surfaces preferably are delimited on one side by the conveyor belts themselves, which form, as a result, receiving belts. The increase of the resistance to the passages of gases is compensated due to the removal of fibers coming from upstream fibering machines (always by considering the line oriented in the direction of passage of the blank). It should be noted that the receptions according to the invention are receptions common to several fibering machines and preferably to 3 or more fibering machines. The number of receptions per production line therefore generally does not exceed two, which makes it possible to prevent the drawbacks of an excessive modularization.

On the other hand, the increasing of the collecting surface in the zones of high base weights makes it possible to maintain in the latter relatively low levels of partial vacuum, for example, advantageously less than 4000 Pa, i.e., at a level much less than the level for which the first damages are observed for high quality fibers, such as glass fibers whose micronaire value is, for example, of 3 for 5 g.

Advantageously, it is chosen to operate with the same level of partial vacuum for all the collecting surfaces. In other words, there is compensated totally from one collecting zone to another, the lower permeability of the felt attributable to the felt thickness already deposited coming from other fibering machines—without impairing the suction, because, as indicated in the introduction, to suck in only a part of the gases would lead to a backflow of fibers especially with the formation of rovings and therefore to obtaining a product of poorer quality.

This invention relates to the cases where the drops of fibers differ according to their original fibering machines, i.e., all the cases where the conveyor belts have a path which is not horizontal but is generally convex. According to the invention, the surfaces of collecting zones Zi increase with the average distance that the fibers must travel to reach these collecting zones Zi.

Advantageously, nothing, therefore, is modified in the position of the fibering machines, and therefore in the dimensions of cores (fibers and air) coming from these fibering machines, but the angle of inclination is modified perpendicularly to the collecting surface relative to the axis of rotation of the cores. The larger this angle of inclination, the larger the surface of the collecting belt intercepted by the core, which thus makes it possible to use the invention without substantially modifying the distance between the fibering machines.

In a preferred way, this variation of the angle of inclination is performed continuously to prevent the sharp edges which can impair with the final quality of the felt. The receiving belt on which the fibers coming from the various fibering machines are deposited then follows a path which, at least in its end portion is a convex curve, for example, elliptical.

Optionally, the use of convex receiving surfaces also can be combined with an increase of the distance between two fibering machines located in the zones of higher base weights and/or with a gradual inclination of the axes of rotation of the fibering machines, these two methods also making possible the increase of the surfaces of the collecting zones.

Preferably, the fibering machines are divided by groups of, for example, 3 or 4, forming as many reception modules as groups: thus a blank corresponds to each module and all the blanks formed then are asserted before being guided in the form of a single felt into the oven for polymerizing the binder. Generally, at the most two reception modules are necessary even for the production lines of high tonnage. There is thus a modularization of the reception, but a modularization which is meant to be limited in much smaller proportions than in the related art.

According to the cases the reception modules can be placed in series one after the other with a single feed channel of glass for the fibering machines or in parallel with, in this case, as many feed channels of molten glass as reception modules. Afterward, the assembly of the blanks is performed by superposition in parallel layers or in interlaced layers, the choice between these two superposition modes being made particularly as a function of the densities desired for the final products.

It also can be advantageous to use, for each reception module, not one but two convergent receiving belts facing one another and symmetrical to one another, the fibers deposited on one or the other belt being assembled into a single felt at the common end of the receiving belts. In this case, the place of final forming of the felt is located at the point of convergence of the two receiving belts.

Since the power necessary for driving the receiving belts is a function of the weight of fibers deposited on each of them, it is preferable to divide the number of fibering machines into equal parts for each receiving belt, which makes it possible to simplify the synchronization of the speeds of the two receiving belts, synchronization necessary to prevent the two formed blanks from sliding on one another. If the fibering machines are odd in number, the last fibering machine preferably has a collecting surface divided between two receiving belts, the symmetry of the core coming from a fibering machine making possible a division into two equal parts if it is chosen to assemble the receiving belts in such a manner that their plane of symmetry contains the axis of symmetry of the core of the central machine.

The curve followed by the path of a receiving belt preferably is a circle, the circular paths certainly are not the optimal paths calculated on the assumption, for example, of a partial vacuum equal in all the collecting zones, but are, from a practical viewpoint, much simpler to use. In this case, the receiving belts consist of the peripheral surface of one or two drums.

Another preferred example is that of a reception module with double drums per group of 3 fibering machines with the forming of a blank between the two drums. When the production comprises n×3 fibering machines, there then are n reception modules which form blanks which then are assembled in a single mat before the polymerization of the resin intended to bond the fibers is caused.

The assembly of blanks coming from various modules then can be obtained as indicated previously by superposing them in parallel layers. The assembly, for example on a horizontal conveyor, of blanks produced in a vertical plane between the drums can be made almost immediately under the drums so that the "life" time of these blanks is very short and the phenomenon of delamination is not found on the finished products. The assembly also can be obtained by lappers.

The reception diagram thus defined—3 fibering machines for two drums—is actually extremely different from those known in the art—where there is either a collecting surface divided into two receiving belts (1 machine—2 drums), or a conveyor belt acting as a collecting surface for each machine (2machines—2 drums), and never conveyor belts common to several fibering machines Actually, in addition to the immediate advantage of a reduction of the number of reception modules for the same production line, the preferred solution according to the invention offers very many advantages.

Since, according to the invention, each reception normally is fed by 3 fibering machines, the minimum base weight able to be obtained with, for example, a line of 6 fibering machines, is only 200 g/m$^2$, it being understood that the sake of mechanical strength In comparison, a reception of the 2 drums per fibering machine type—or 2 drums for 2 fibering machines—is not able to produce mats of mineral wool whose base weight is respectively at least 600 or 300 g/m$^2$. Actually, this lower limit of 200 g/m$^2$ is lower than the limit in lightness of the marketed products.

Further, the drums constitute very large collecting surfaces able to receive large flows, which correspond perfectly to the possibilities of the fibering machines The authors of this invention thus have found that it is perfectly possible to directly produce a blank of a high base weight, without systematic recourse to the lappers whose known drawback is a relatively low speed which limits the total speed of the production line.

Another advantageous point of the invention is that the greater effectiveness of the suction leads to a greater cooling of the felt; now the colder the felt, the less danger of the binder polymerizing before the passage in the polymerization oven, which leads to final products exhibiting a much better mechanical strength, a larger proportion of the resin actually being used to bond the fibers, while too hasty a polymerization is performed practically as pure loss, the thickness of the felt not being controlled yet in this state of the process. This lower temperature leads, moreover, to a lower evaporation of the sizing, of which a larger amount is found in the finished product, which reduces the costs for depollution fumes.

For the use of this preferred form of the invention, the device joined to each group of 3 fibering machines comprises a hood isolating each reception in which a pair of perforated drums are placed over their entire peripheral surface and provided with devices for centering and driving in rotation and inside suction boxes which are stationary when the drums are in rotation. The suction surface corresponds to the peripheral surface of the drum placed inside the hood and opposite an inside suction box.

Driving of each drum is preferably obtained by pairs of rollers, shouldered, for example, being used also in axial guiding, each pair consisting of an idle roller and a driving roller whose rotation is controlled, for example, by a motor mounted on its shaft, the rollers preferably being provided with a coating giving a good friction coefficient The driving by rollers cannot lead to a deterioration of the other elements of the reception and particularly those being used to produce the seal of the reception chamber, and further, the inside space of the drum is left completely free and is therefore completely available for the mounting of the suction box.

To prevent a blocking of the reception by agglomerated fibers stuck to the walls of the hood, the latter preferably are cooled, so that the temperature of the walls is always less than the temperature of polymerization of the binder Moreover, the hood preferably is in two parts. The lower part, closest to the drums, is formed from cooled plates provided with recesses corresponding to the location of the drums. The upper part is of the rotating board type joined to the cleaning devices outside the hood, so that the fibers which are stuck to the boards are evacuated for good outside the reception hood.

Means are further provided such as flexible screens guaranteeing the seal between the hood and the drum, on one hand, and, between the inside suction box and the drum, on the other hand, the fiber itself being sufficient to assure the seal between the drums.

It further is advantageous to provide each drum with a blowing ramp of compressed air, the blown jet being directed to the output of the drums to promote the separating of the fibers and the forming of the blank under the drums.

Preferably, means are provided for modifying the length and the location of the suction zone relative to the fibering machines. These means are, for example, devices making it possible to rotate the inside boxes, in this case centered on the axis of rotation of the drums, to displace the peripheral zone of the drum opposite an inside box.

It finally is advantageous to join to the reception module, for each blank, a drawing roller driven at a peripheral speed strictly identical with that of the horizontal conveyor which recovers the various formed blanks, the peripheral speed of the drums being set very slightly lower than the speed of the horizontal conveyor to take into account the creep of the fibers which occurs under the effect of gravity during the vertical path of the blanks.

Moreover, the suction boxes and the drums themselves preferably are provided with suitable means for cleaning and drying, particularly to prevent their being soiled by fine fibers.

Accordingly, the present invention relates to a process of reception for the separation of fibers and gases produced by multiple fibering machines to obtain a mat of mineral wool, the process comprising the steps of: collecting the fibers by suction of the gases, wherein each fibering machine comprises its own collecting zone; and evacuating the collected fibers from the collecting zone through at least one conveyor belt common to several collecting zones, wherein the collecting zones comprise surfaces which increase in a direction of an increase in base weight on the conveyor belts.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
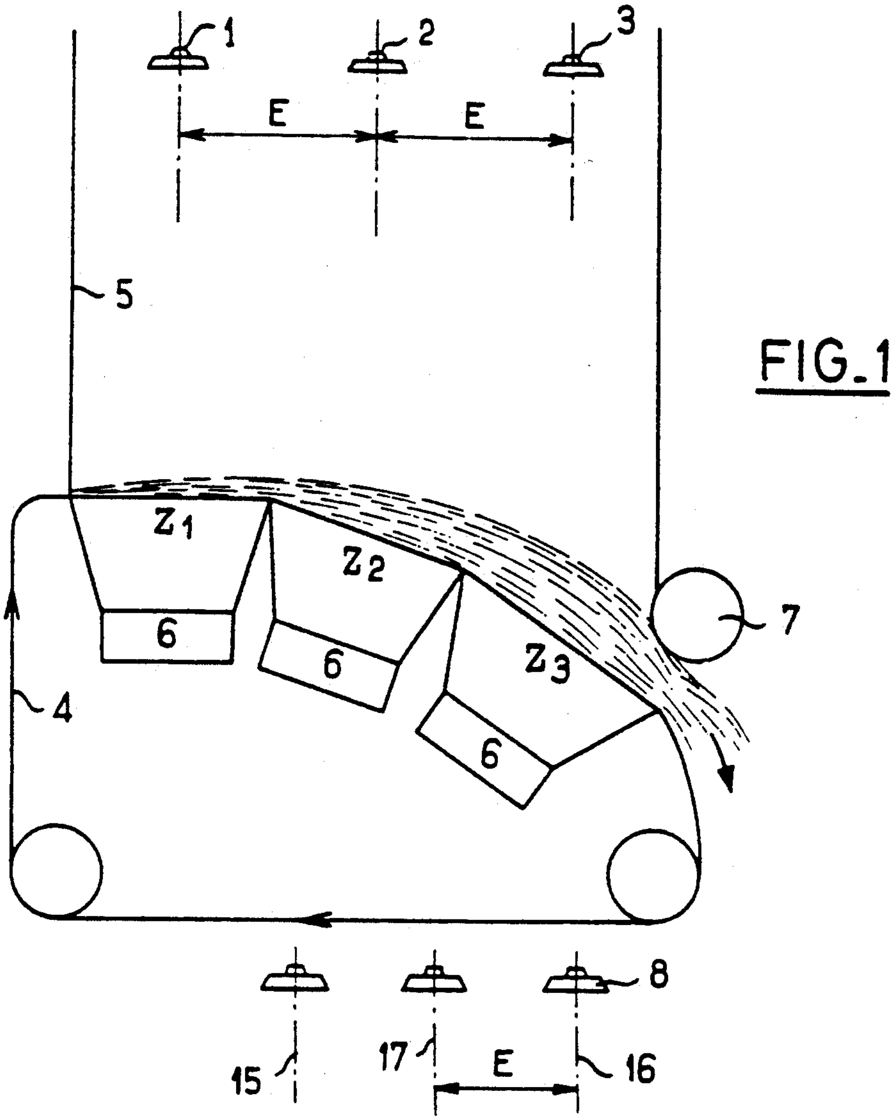
FIG. 1 shows a general diagram illustrating the principle of the process according to the invention.

FIG. 1 illustrates by a flow chart the process of reception according to the invention for a glass wool production line comprising 3 fibering machines 1, 2, 3 placed in the same row. These fibering machines 1, 2, 3 consist, for example, of centrifuges rotating at great speed, provided at their periphery with a large number of orifices by which the molten material, preferably glass, escapes in the form of filaments which then are drawn into fibers by a concentric gas stream, parallel to the axis of the centrifuge, emitted at high temperature and speed by an annular burner. Optionally, other fibering devices well known in the art can be used, which all make possible the forming of a core of fibers, centered on an axis, cores formed by the drawing gases and especially the gases induced in a very large amount.

The reception of fibers, intended to separate the latter from the gases, is obtained by a gas-permeable endless belt 4 given continuously. A hood 5 laterally delimits the collecting zone of the fibers. The suction of the gases is obtained by independent boxes 6 under partial vacuum. A box 6 is joined here to each fibering machine 1. Hood 5 is closed in as airtight a way as possible and for this purpose is provided at the output with a press-roller 7 optionally assuring a certain traction on the felt to help extract it from the hood.

According to the invention, a collecting zone Zi, delimited below by endless belt 4, corresponds to each fibering machine "i" (i=1, 2, 3 . . . ). These zones Zi are increasing with their index and therefore are all the larger as they are close to the output.

A reception has been proposed comprising as many boxes as fibering machines, but if the invention makes possible a homogenization of the partial vacuum values, boxes common to several fibering machines can, of course, be used without going outside the scope of the invention. At the limit, only a single box can be used for the entire row of machines 1, 2, 3.

Advantageously, distance E between the machines is constant; there is therefore no increase of the induced air and therefore a lower risk of backflow of the gases and the forming of rovings.

The path shown in FIG. 1 is imaginary, in reality, work is done with nonrectilinear but convex paths, for example, elliptical, with, as the simplest embodiment, a circular path associated with the use of drums.

Preferably, the number of fibering machines for a reception is equal to 3 or 4, so that for a large production line, two reception modules will be used.

Figure 2:
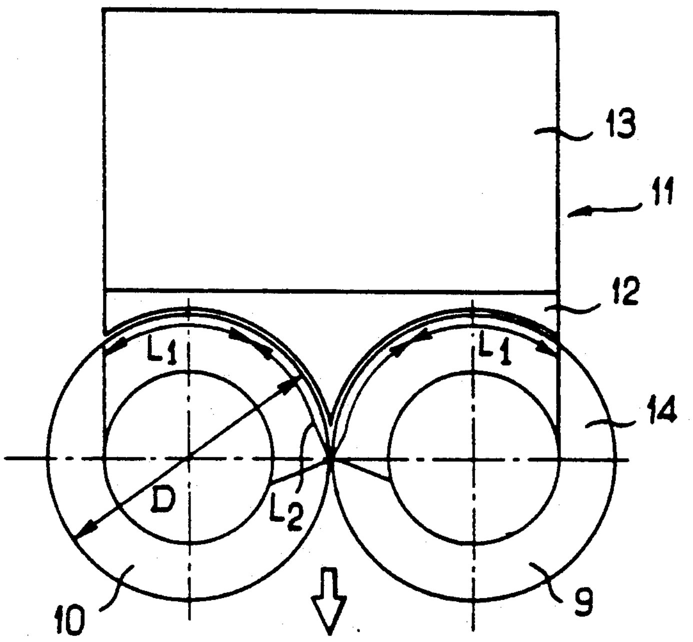
FIG. 2 shows an embodiment diagram of a reception module according to a preferred embodiment of the invention.

An example of such a module is diagrammed in FIG. 2 provided to gather the fibers produced by 3 fibering machines. Two drums 9, 10 moved in opposite rotation and rotating toward one another, are placed under fibering machines 8. These drums 9, 10 are placed under a hood 11.

Hood 11 comprises a lower part 12, cooled by suitable means, with recesses in the shape of arcs of a circle for housing the drums. Upper part 13 also can be composed of cooled stationary plates or better, with rotating boards—of the vertical endless belt type—whose rear (i.e. The part outside the reception unit) is provided preferably with cleaning means. The cooling means prevent the occurrence of a total- blocking of a reception by agglomerated fibers; the rotating boards themselves improve the quality of the felt if small tufts of fibers are prevented from being formed as well as tufts which, without being able to cause the blocking of the installation, all the same can slightly impair the homogeneity of the felt, because when they are finally detached from the wall, they form zones in the felt with a higher content of binder which is marked by a darker tint, giving the appearance of spots.

The seal of the reception is critical and preferably is obtained by a polyurethane conveyor belt.

Drums 9, 10 are placed in a pit under the fibering machines at a depth calculated so that the minimum drop of the fibers is greater than 2500 mm to prevent the average impact speed of the fibers on the drum, calculated at the center of the core, from being greater than 20 m/s. Preferably, this drop does not exceed 5000 mm to prevent the forming of large fiber tufts detrimental to a good quality of the insulating mat.

Drums 9, 10 exhibit a gas-permeable, perforated peripheral surface. They consist, for example, of two rigid round end plates, on which a perforated core is screwed, the diameter of the orifices being chosen as a function of the type of fibers produced. They are provided with devices for centering and guiding, for example, on rollers, their driving in rotation being performed, for example, by chain or, in a preferred way, by outside rollers which guide the drum axially, these rollers being coated, for example, with polyurethane to assure a good drum-roller friction.

In these drums, inside suction boxes 14 are mounted which are centered on the rotation shafts of the drums and attached, for example, to the pipe of a valve provided for checking the drum. Boxes 14 are delimited by the side walls mounted, for example, along the radii of the drums, with an angle of 120°, for example, the boxes able to be rotated around the axis of the drums to modify the length of suction and the location of the suction zone, particularly when the reception conditions are to be modified on the part of the stopping of the central fibering machine as it is explained below.

Preferably, elements for cleaning and drying the surface of the drums are provided to be integrated in these boxes to prevent the orifices of the drums from being clogged over time by the finest fibers. These elements for cleaning and drying are, for example, of the brush, convergent nozzle or air ramp type for the detachment of fine fibers.

By way of example, good results have been obtained with a washing unit consisting of a nylon brush with long bristles placed inside the drum and driven in rotation by the latter and a small brush mounted outside the drum, these two brushes optionally being rounded out downstream (relative to the direction of rotation of the drum) by washing and drying nozzles preferably operating only intermittently and which clean the surface of the drum of the film of the binder which is deposited over time.

These suction boxes are connected by pipes to one or more blowers able to create the necessary partial vacuum, not shown here.

In FIG. 2, it can further be noted that axis 15, 16 of lateral fibering machine 8 is vertical from drum 10 or 9 facing it, axis 17 of the central fibering machine itself being merged with the axis of the median plane of the pair of drums. This arrangement makes it possible to obtain the largest possible useful suction surface. Under these conditions, diameter D of the drums therefore should be chosen equal to twice distance E between two fibering machines or more precisely very slightly smaller than the latter to preserve a free space of 100 mm, for example, between the two rollers.

The fibers produced by the lateral fibering machines with a reception fall in the suction zones diagrammed by double arrows $L_1$, while the fibers produced by the central machine fall on one or the other of the drums, in reception zone $L_2$. This zone $L_2$ is practically double the length of zone $L_1$. Thus, the resistance to the passage of the fumes of the central machine created by the fibers coming from the lateral machines and already deposited on the surface of the drum when the latter reaches zone $L_2$ is compensated in a very broad way.

The reception can operate with adjustments of speed to compensate the loss of base weight, when one of the lateral machines is stopped. If the stop relates to the central fibering machine, it is preferable to offset the suction zones to the sides to limit the increase of induced air generated by the central "vacuum" and especially to prevent the forming of rovings which wind around themselves close to the drums. This fibering possibility constitutes a very great advantage of the reception modules according to the invention, because it takes into account the operating hazards of fibering machines.

In a rather paradoxical way, a reception module according to the preferred embodiment of the invention makes it possible to obtain products of higher quality than the products able to be obtained when two reception drums are provided for two fibering machines. This can be explained by the fact that the core coming from a fibering machine is not perfectly homogeneous; an analysis of the profile of speeds of gases actually shows that the speed is maximum around the axis of rotation of the fibering machine and decreases on the edges of the core. When one or only two fibering machines are used, an air current tangent to the surface is generated at the periphery of the reception surface; with the strongest suction on the lateral parts less laden with fibers. This tangent current drives the fibers which roll on themselves and form rovings. When the number of fibering machines is increased by preserving a small distance between the latter, a profile of partial vacuums is obtained isomorphic to the profile of the speeds—with the effect of a better homogeneity of the products.

Figure 3:
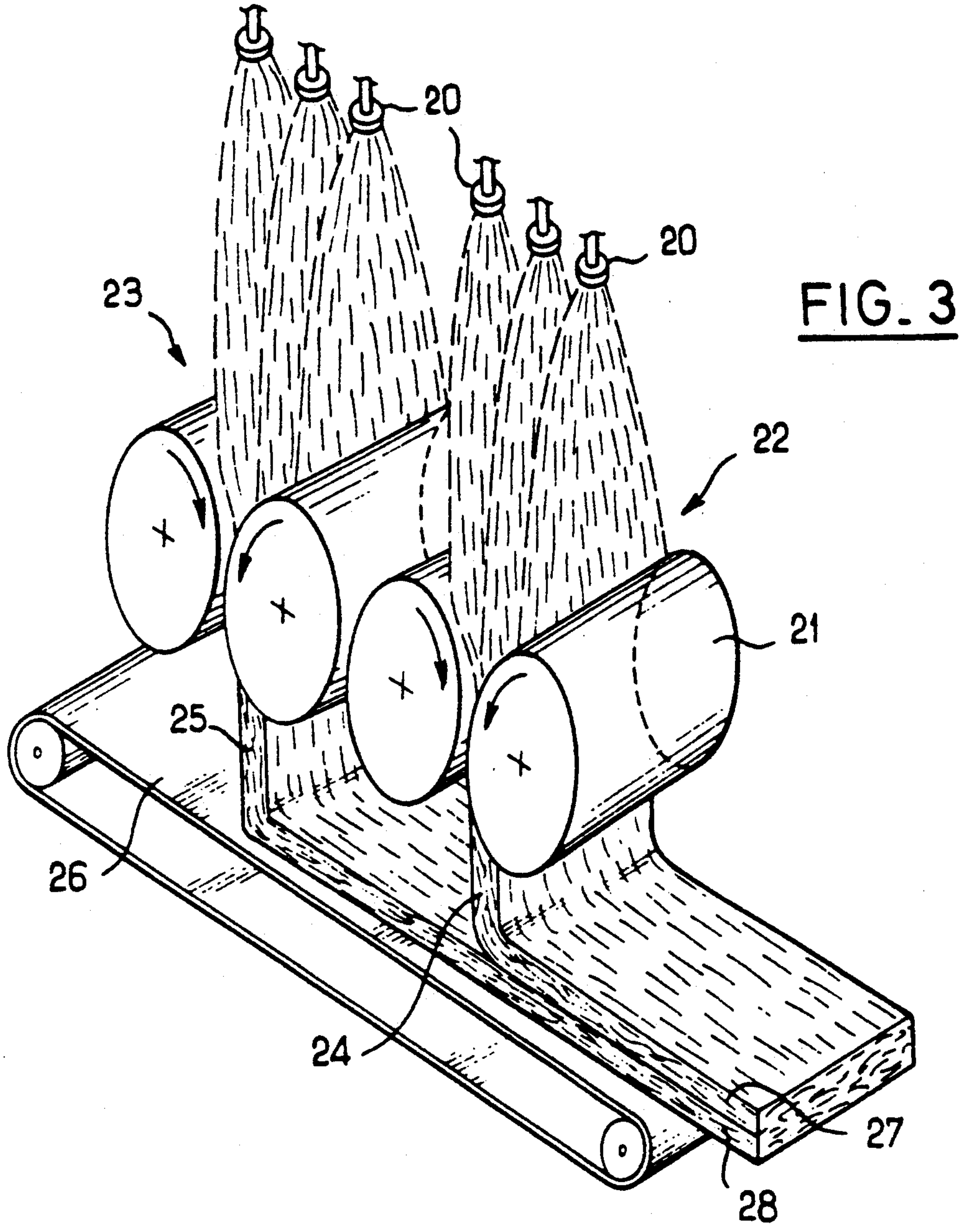
FIG. 3 shows a perspective view of a line comprising six fibering machines and two reception modules according to FIG. 2, with an assembly of blanks in parallel.
Figure 4:
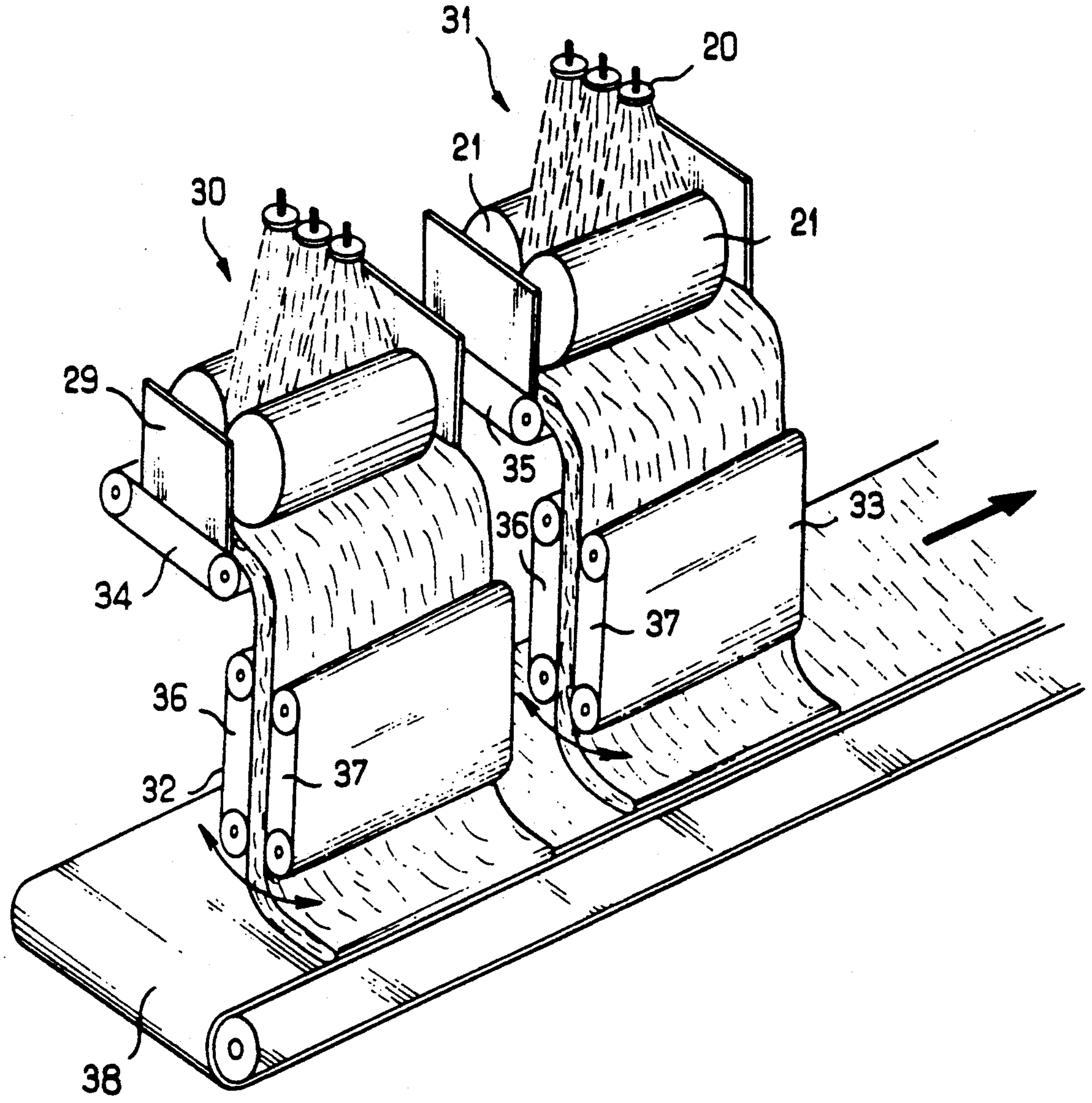
FIG. 4 shows a view identical to FIG. 3 but with an assembly of blanks by lappers

FIGS. 3 and 4 illustrate the application of the reception modules according to the invention to production lines comprising 6 fibering machines. FIG. 3 corresponds to a double reception in a line, i.e., that the 6 fibering machines are fed molten glass by the same main channel, with an assembly here of blanks by superposition in parallel layers.

Under 6 fibering machines 20 there are placed two receptions consisting of two pairs 22, 23 of two drums 21 moved in opposite rotation, each reception gathering the fibers produced by a group of 3 fibering machines, the central fibering machine of a given group being oriented along the median plane to two drums of a reception. Each pair of drums is isolated from the other pairs of drums by a hood, the receptions therefore are independent here. Each reception unit thus forms a basic module, reproduced as many times as necessary according to the production capabilities of the line, the relative arrangement of the modules relative to one another having, however, to take into account the supply means of molten glass of the various fibering machines, i.e., the number of molten glass supply channels provided at the output of the melting furnace and the arrangement of the latter in a line as shown here, or in parallel as in FIG. 4.

The fibers collected by a given pair of drums form a blank 24 or 25 which falls in a vertical plane and then is gathered by a horizontal conveyor 26 of nonperforated endless belt type located at the bottom of the pit in which blanks 24, 25, coming from various groups of 3 fibering machines, are superposed in parallel layers 27, 28. Finally, an inclined conveyor, not shown here, carries the formed felt outside the reception pit.

During its vertical drop to the horizontal conveyor, the blank has a slight tendency to stretch, all the more the lower the base weight. To prevent the felt from forming a loop, the horizontal conveyor therefore should be driven at a speed very slightly greater than the peripheral speed of the drums; depending on the base weight, the theoretical deviation to be respected is between 0 and 1%. As it is relatively difficult to operate exactly with a speed ratio corresponding to this theoretical ratio, it is advantageous to equip the installation with drawing rollers placed just above the horizontal conveyor, not shown here, these drawing rollers most often exerting a slight traction on the felt and being driven exactly at the speed of the horizontal conveyor.

FIG. 4 corresponds to a double reception in parallel joined to an assembly of blanks by superposition in interlaced layers.

Thus, reception modules 30, 31 joined to lappers 32, 33 are shown. An element with an oscillating movement fed by a conveyor belt 34, 35 thus is joined to each module, so that the blank consecutively undergoes 2 changes of direction of 90°. Oscillating element 32 or 33 consists of two continuous belts 36, 37 between which the blanks pass. Oscillating element 32 is connected by a connecting rod-crank system to a driving motor imparting to it a balance arm movement, so that the blank is deposited on a conveyor 38 in the form of interlaced felt layers, the conveyor 38 having a direction of passage perpendicular to the initial direction of the blanks. The continuous belts also can play a role of drawing the felt, a role which, for the receptions not provided with oscillating elements, can be advantageously filled by the drawing conveyor belts or roller 7 seen in FIG. 1. The drawing makes it possible to prevent an accumulation of the felt in the hood.

The device of FIG. 4 makes possible the production of products whose base weight is, for example, greater than 10 kg per m$^2$, while the device of FIG. 4 is fully satisfactory for the more ordinary products whose base weight is, for example, close to 4000 g/m$^2$, which already is being considered for an insulating product of glass wool as a heavy product.

The performance data of the receptions according to the invention further was quantitatively verified.

In a first step, 6 fibering machines spaced along a set distance of 2000 m were used, by using various types of reception modules and different numbers of modules. The following results were obtained:

| Test No | 1 | 2 | 3 | 4 | 5 | 6 |
|---|---|---|---|---|---|---|
| Number of modules | 1 | 6 | 1 | 3 | 1 | 6 |
| drums/belts | belt | drum | drum | drum | drum | drum |
| Number of drums | — | 12 | 12 | 6 | 6 | 4 |
| Diameter of drums (mm) | — | 950 | 950 | 1950 | 1950 | 2575 |
| Flow of fumes (%) | 100 | 98 | 107 | 99 | 107 | 79 |
| Maximum partial vacuum (Pa) | 13140 | 480 | 550 | 1260 | 1410 | 1520 |
| Power | 100 | 22 | 24 | 29 | 33 | 53 |

All the tests were made on the same production line comprising 6 fibering machines of centrifuge type of 20 tons of molten glass per day and of a final base weight of the glass wool mat of 2500 g/m$^2$.

The first test corresponds to a so-called belt fiber reception which made it possible to define a reference base 100 for the total flow of fumes to be sucked in and the total power dissipated at the level of the installation. By way of indication, this flow of fumes of 100% corresponds to a flow of fumes (drawing gases or induced gases) of 360,000 to 450,000 Nm$^3$/hour.

Tests 2 and 3 correspond to receptions with two drums for each fibering machine, these receptions being isolated or not from one another to form separate modules. The maximum partial vacuum undergone by the felt is much lower than that of the reference test, and much lower than the value for which the first damages can be found. The total power dissipated also is weaker, but the gain is not directly comparable to that recorded at the level of the partial vacuums, because of the larger load losses due to the multiplication of related equipment of the pipe type, washer type, etc.

It further is found that the best results are obtained with an extreme modularization (6 modules for 6 fibering machines), which causes the multiplication of hoods and therefore soiling zones which, for lack of a suitable cleaning, allow dust or connected fiber clusters to fall which in their turn degrade the quality of the product. When this modularization (test no. 3) is eliminated, a very large increase of the flow of fumes—which is reflected by a slight increase of the maximum partial vacuum exerted on the felt for their suction—is obtained. Moreover—and what the above table does not show—the quality of the fibers is lower, with the result of a decrease of the insulating power of the final felt.

The same conclusions are found with tests 4 and 5 corresponding to 2 fibering machines for two drums, except the forming of fiber rovings should be noted, rovings which are wound on both sides of the drums, which cause a very clear degradation of the final quality of the felt.

On the other hand, by proceeding according to the invention (test no. 6), the same conditions of the viewpoint of the energy balance and again the very low partial vacuum values are found while having only two reception modules and therefore a much lower initial investment.

Finally, it is advantageous to compare two production lines, the first is traditional one-line line, with a horizontal receiving belt, i.e., for which the collecting zones are increasing in the direction of the increase of the base weights, this increase being obtained by a gradual increase of the distances between the fibering machines; this line comprises two reception modules formed by convergent receiving belts (tests 7 and 9), the second line is in accordance with the diagram of FIG. 3 (tests 8 and 10).

| Test No. | 7 | 8 | 9 | 10 |
|---|---|---|---|---|
| Diameter D of the drums (mm) | | 2575 | | 2575 |
| Minimum distance between 2 machines | 1500 | 1300 | 1500 | 1300 |
| Suction length L (mm) | 2600 | 2653 | 2650 | 2653 |
| Flow of fumes (%) | 100 | 79 | 100 | 78 |
| Speed m/s | 3.29 | 2.36 | 3.29 | 2.35 |

-continued

| Test No. | 7 | 8 | 9 | 10 |
|---|---|---|---|---|
| Maximum partial vacuum (Pa) | 4890 | 1520 | 8140 | 2470 |
| Total power | 100% | 52% | 100% | 45% |

L represents the length of the collecting zones corresponding to the highest base weight. Tests 7 and 8 related to the production of a felt of a base weight equal to 2500 g/m², tests 9 and 10 to a base weight of 4000 g/m², with, in all the cases, 2×3 centrifuges through which a flow of 20 tons of molten glass is made to pass per day.

In the two cases, dense products are obtained easily without resorting to a lapper. However, the comparison of the speeds of the passage of the gases through the felt and partial vacuums or a level of the zones of higher base weight indisputably show the superiority of the preferred embodiment of the invention.

The possibility of proceeding with nonconstant distances also can be extended in the case of receptions according to the invention, corresponding to separate drops as a function of the fibering machines, for example, in a reception diagram according to FIG. 1. The most satisfactory results are obtained, however, with n reception modules in two drums for 3n fibering machines.

A last advantageous aspect of the invention lies in the fact that it leads to forming relatively cold felts, because the blanks are cooled in the open air before being recovered by the horizontal conveyor and especially because the suction is just as efficient in the zone of high base weights as in the zone of low base weights, which prevents the accumulation of hot gases. The products obtained according to the invention typically have a temperature at the input of the oven lower by 20° to 50° than that of products according to the art, the greatest differences being observed for the heaviest products. A less prepolymerization of the binder results, which leads to significantly improved mechanical strengths.

Moreover, a lower temperature—joined to a higher initial thickness of the fibers, which are not packed by the suction in the reception—provide a greater stability of the production, particularly a greater constancy of thickness of the products, which makes it possible to reduce the nonoperational extra thicknesses simply intended to guarantee to the client a nominal given thickness.

Obviously, numerous modifications and variations are possible in light of the above teachings. It is therefor-e to be understood that within the scope of the appended claims, the invention may be practiced otherwise than as specifically described herein.

What is claimed as new and desired to be secured by Letters Patent of the United States is:

1. Process of reception of insulating mineral fibers to separate, under fibering machines, fibers and ambient gases to obtain a mat of mineral wool, said process comprising the steps of:

positioning at least a group of three fibering machines over one pair of rotatable drums such that a predetermined distance separates each of the fibering machines and a vertical axis of a first one of said three fibering machines intersects a rotational axial axis of one of said pair of drums, a vertical axis of a second one of said three fibering machines is merged with an axis of a median plane of the pair of drums, and a vertical axis of a third one of said three fibering machines intersects a rotational axis of the other of said pair of drums, said fibering machines being positioned such that diameter of each of said drums is approximately twice the distance between each of the fibering machines; and collecting the mineral fibers on said pair of rotatable drums to form blanks, said blanks being assembled before the polymerization of a resin intended to bond the fibers, wherein fibers produced by said first and third fibering machines fall on two first suction zones defined on each of the drums and fibers produced by the second fibering machine fall on a second suction zone which is between the two first suction zones and is defined on both drums, a length of the second suction zone being approximately twice the length of each of the first two suction zones.

2. Process of reception of insulating mineral fibers to separate, under fibering machines, fibers and ambient gases to obtain a mat of mineral wool, said process comprising the steps of:

positioning at least a group of three fibering machines over one pair of rotatable drums such that all of said three fibering machines are separated by a predetermined distance and located along a horizontal axis which is perpendicular to a rotatable axis of each of said pair of drums, said fibering machines being positioned such that a diameter of each of said drums is approximately twice the distance between each of the fibering machines; and collecting the mineral fibers on said pair of rotatable drums to form blanks, wherein fibers produced by first and second lateral fibering machines fall on two first suction zones defined on each of the drums and fibers produced by a third central fibering machine fall on a second suction zone which is between the two first suction zones and is defined on both drums, an length of the second suction zone being approximately twice the length of each of the first two suction zones;

wherein the minimum drop of mineral fibers is such that the rate of impact of fibers on the drum is less than 20 m/s.

3. Process of reception of mineral fibers according to claim 1, the minimum drop of mineral fibers is such that the rate of impact of fibers on the drums is less than 20 m/s.

4. Process of reception of mineral fibers according to claim 2, comprising the further step of:

assembling the blanks before polymerizing a resin intended to bond the fibers.

* * * * *